(No Model.)

J. H. MOORE.
HARROW.

No. 447,472. Patented Mar. 3, 1891.

Witnesses:
John L. Jackson
Arthur F. Durand

Inventor:
Josiah H. Moore
by Bond, Adams & Jones
Attys.

United States Patent Office.

JOSIAH H. MOORE, OF BLOOMINGTON, ILLINOIS, ASSIGNOR TO HIMSELF AND THE WALTON PLOW COMPANY, OF SAME PLACE.

HARROW.

SPECIFICATION forming part of Letters Patent No. 447,472, dated March 3, 1891.

Application filed December 2, 1890. Serial No. 373,377. (No model.)

*To all whom it may concern:*

Be it known that I, JOSIAH H. MOORE, residing at Bloomington, in the county of McLean and State of Illinois, and a citizen of the United States, have invented a new and useful Improvement in Harrows, of which the following is a specification, reference being had to the accompanying drawings, in which—

Figure 1:
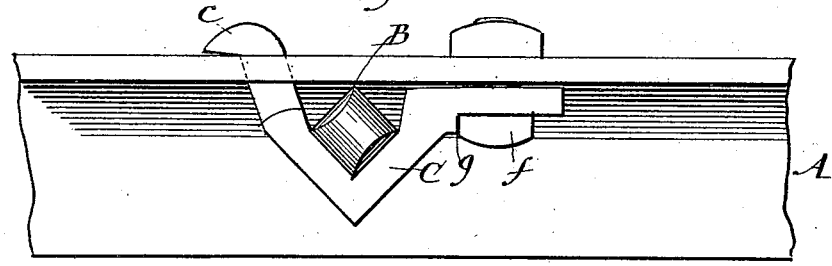
Figure 2:
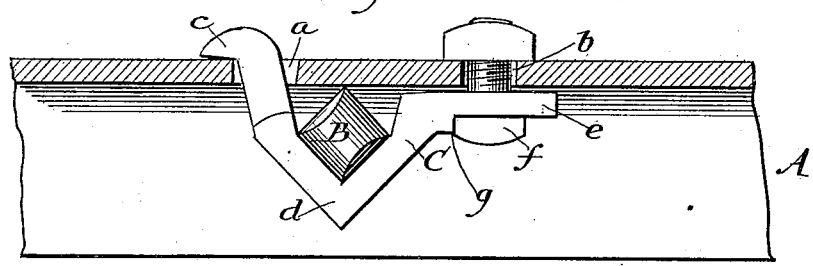
Figure 3:
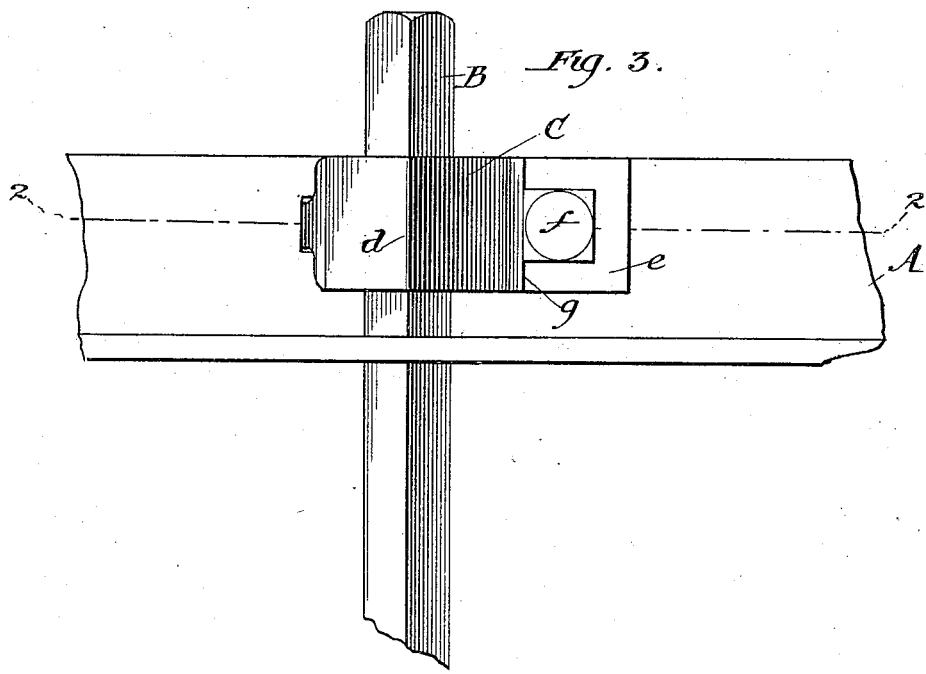

Figure 1 is a top or plan view. Fig. 2 is a horizontal section at line 2 2 of Fig. 3. Fig. 3 is a side elevation.

Only so much of a harrow is shown as is necessary to illustrate my invention. Heretofore considerable difficulty has been experienced in providing simple and cheap devices for attaching harrow-teeth to the bars of the harrow.

The object of my invention is to provide a simple and cheap device by which the teeth can be readily and easily attached; and it consists of an improved clamp adapted to clamp a harrow-tooth to the bar.

In the drawings, A represents an angle-iron, which forms the bar to which the harrow-teeth are secured.

B represents one of the harrow-teeth.

C represents the clamp.

The horizontal portion of each angle-iron A is provided with a hole through which a harrow-tooth B can pass. The vertical portion of the angle-iron is provided with an opening $a$ and a bolt-hole $b$, as is best shown in Fig. 2.

The clamp C consists of a hook $c$, which is adapted to pass through the opening $a$ in the angle-iron A, an angular portion $d$, adapted to clasp the angular harrow-tooth B, and a plain portion $e$, adapted to receive a bolt $f$. The bolt $f$ passes through the plain portion $e$ and the hole $b$ in the angle-iron A. A shoulder $g$ is provided on the clamp C to prevent the head of the bolt $f$ from turning.

The harrow-tooth B is secured in position by passing it through the hole in the horizontal portion of the angle-iron A, and by then passing the hook $c$ of the clamp C through the hole $a$, and passing the bolt $f$ through the plain portion $e$ of the clamp and the hole $b$ of the angle-iron.

By slightly loosening the nut of the bolt $f$, the harrow-tooth will be sufficiently loosened to permit it to be withdrawn and given a quarter-turn, as is necessary when the forward edge of the tooth has become worn, and the tooth can be again secured in position quickly by tightening the nut of the bolt $f$.

What I claim as new, and desire to secure by Letters Patent, is—

The combination, with a harrow-tooth and the angle-iron having holes $a\ b$, of a clamp C, having a hook $c$, adapted to pass through the hole $a$, an angular portion $d$, adapted to clamp the tooth, and a plain portion $e$, adapted to be bolted by a bolt $f$ to the angle-iron, substantially as specified.

JOSIAH H. MOORE.

Witnesses:
WILLIAM M. GALBRAITH,
THOMAS J. WILLEVER.